US011113691B2

(12) United States Patent
Castoro et al.

(10) Patent No.: US 11,113,691 B2
(45) Date of Patent: Sep. 7, 2021

(54) VOICE INTERFACE TRANSACTION SYSTEM USING AUDIO SIGNALS

(71) Applicant: American Express Travel Related Services Company, Inc., New York, NY (US)

(72) Inventors: Matthew Joseph Castoro, New York, NY (US); Andrew Lei, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 196 days.

(21) Appl. No.: 16/141,711

(22) Filed: Sep. 25, 2018

(65) Prior Publication Data
US 2020/0097965 A1   Mar. 26, 2020

(51) Int. Cl.
*G10L 15/22* (2006.01)
*G06Q 20/40* (2012.01)
*G06Q 20/20* (2012.01)

(52) U.S. Cl.
CPC ......... *G06Q 20/401* (2013.01); *G06Q 20/209* (2013.01); *G10L 15/22* (2013.01); *G10L 2015/225* (2013.01)

(58) Field of Classification Search
CPC ... G10L 15/22; G10L 2015/225; G10L 21/00; G10L 15/08; G10L 2015/088; G10L 2015/223; G10L 15/30; G10L 2021/02166; G10L 21/0208; G10L 15/04; G10L 15/083; G10L 15/32; G10L 25/18; G10L 25/27; G10L 25/51; G10L 25/78; G10L 25/84; G06Q 20/425; G06Q 20/32; G06Q 20/401; G06Q 20/209; G06Q 20/102; G06Q 20/16; G06Q 20/3272; G06Q 20/346; G06Q 20/4012; G06Q 2220/00; G06Q 30/02; G06Q 20/325; G06Q 20/36; G06Q 20/322; G07F 7/0886; G07F 7/1008; G07F 3/167; G07F 3/165; G07F 3/162; G07F 9/542; H04W 12/02

See application file for complete search history.

(56) References Cited

U.S. PATENT DOCUMENTS

| 10,587,430 | B1 * | 3/2020 | Smith | .................. H04W 4/80 |
| 10,621,981 | B2 * | 4/2020 | Sereshki | ................. G10L 15/08 |
| 10,748,529 | B1 * | 8/2020 | Milden | ................... G10L 15/22 |
| 10,878,811 | B2 * | 12/2020 | Smith | ..................... G10L 15/08 |

(Continued)

*Primary Examiner* — Abdelali Serrou
(74) *Attorney, Agent, or Firm* — Sterne, Kessler, Goldstein & Fox P.L.L.C.

(57) ABSTRACT

Systems and methods for voice-enabled transactions are disclosed. A merchant system may generate a transaction request comprising a transaction amount and a merchant identifier. The merchant system may invoke an audio signal generator to generate an audio transaction signal comprising the transaction request data. A voice assistant may play the audio transaction signal. The user initiating the transaction may use a mobile device to detect and ingest the audio transaction signal. In response to detecting and ingesting the audio transaction signal, the mobile device may interact with a payment network to authorize, process, and complete the transaction request. The payment network may transmit a transaction approval to the merchant system.

20 Claims, 3 Drawing Sheets

(56) References Cited

U.S. PATENT DOCUMENTS

| | | | |
|---|---|---|---|
| 2010/0131347 A1* | 5/2010 | Sartipi | G06Q 20/325 705/14.33 |
| 2010/0180009 A1* | 7/2010 | Callahan | G06Q 30/02 709/217 |
| 2012/0290478 A1* | 11/2012 | Crofts | G06Q 40/00 705/44 |
| 2013/0204697 A1* | 8/2013 | Boal | G06Q 30/02 705/14.51 |
| 2014/0188646 A1* | 7/2014 | Itwaru | G06Q 20/202 705/21 |
| 2014/0188733 A1* | 7/2014 | Granbery | G06Q 20/3278 705/64 |
| 2014/0279546 A1* | 9/2014 | Poole | G06Q 20/3224 705/44 |
| 2014/0344011 A1* | 11/2014 | Dogin | G06Q 30/016 705/7.29 |
| 2015/0220924 A1* | 8/2015 | Bakker | G06Q 20/327 705/14.27 |
| 2017/0004471 A1* | 1/2017 | Jiva | G06Q 20/3223 |
| 2017/0323297 A1* | 11/2017 | Shanmugam | G06Q 20/223 |
| 2017/0330215 A1 | 11/2017 | Bruno | |
| 2018/0181951 A1* | 6/2018 | Goldfinger | G07G 1/0009 |
| 2018/0358022 A1* | 12/2018 | Karnati | G10L 15/22 |

\* cited by examiner

VOICE INTERFACE TRANSACTION SYSTEM USING AUDIO SIGNALS

FIELD

The disclosure generally relates to transactions with a merchant, and more specifically, to a voice interface transaction system using audio signals.

BACKGROUND

Users may desire to initiate transactions with a merchant using various methods. For example, a user may initiate a transaction with a merchant in person (e.g., via a brick and mortar store), by telephone, or online (e.g., via a mobile application, merchant website, or the like). Users may initiate and complete transactions in person by interacting with the merchant's point of sale system such as, for example, by swiping, inserting, or tapping (e.g., via near field communication (NFC) in a transaction instrument; by using a mobile device linked to the transaction account (e.g., via BLUETOOTH®, NFC, etc.); and/or the like). A technical problem is that NFC, BLUETOOTH®, and similar transaction channels may be unsecure, and may be susceptible to transaction data being intercepted or misused by a third-party. A further technical problem is that NFC, BLUETOOTH®, and similar transaction channels used by mobile devices may negatively impact remaining mobile device battery life. Moreover, merchants may face increased costs from the purchase and upkeep of point of sale systems.

Users may initiate and complete transactions online using an internet of things (IoT) device, mobile device, smart speaker, or the like. For example, a user may verbally interact with the IoT device, mobile device, or smart speaker by audibly speaking the transaction account number, or by accessing and using a transaction account number saved in a virtual payment platform such as GOOGLE PAY®, APPLE PAY®, or the like. Therefore, users may be limited in voice-enabled transactions by either using an unsecure channel (e.g., the audible relay of a transaction account number), or by preregistering with a virtual payment platform.

SUMMARY

Systems, methods, and articles of manufacture (collectively, the "system") for voice-enabled transactions using audio signals are disclosed. The system may generate a transaction request comprising a transaction amount and a merchant identifier. The system may generate an audio transaction signal comprising the transaction request. The system may play the audio transaction signal. A transaction account holder device may be configured to detect and ingest the audio transaction signal in response to the voice assistant playing the audio transaction signal.

In various embodiments, the audio transaction signal may be generated by invoking an audio signal generator by transmitting the transaction request to the audio signal generator. In response to receiving the transaction request, the audio signal generator may be configured to generate the audio transaction signal. The audio signal generator may be configured to encrypt the audio transaction signal. In various embodiments, the audio transaction signal may be played by invoking a voice assistant by transmitting the audio transaction signal to the voice assistant. The voice assistant may comprise a component of the transaction account holder device.

In various embodiments, in response to detecting and ingesting the audio transaction signal the transaction account holder device may be configured to interact with a payment network to authorize the transaction request. In response to authorizing the transaction request the payment network may be configured to transmit a transaction authorization to the system. The system may receive the transaction authorization from the payment network, and in response, may be configured complete the transaction request.

In various embodiments, the transaction account holder device may configured to detect the audio transaction signal through at least one of passive listening or active listening. The audio transaction signal may comprise a frequency of about 20 Hz to about 20,000 Hz. The audio transaction signal may comprise a frequency inaudible to humans.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
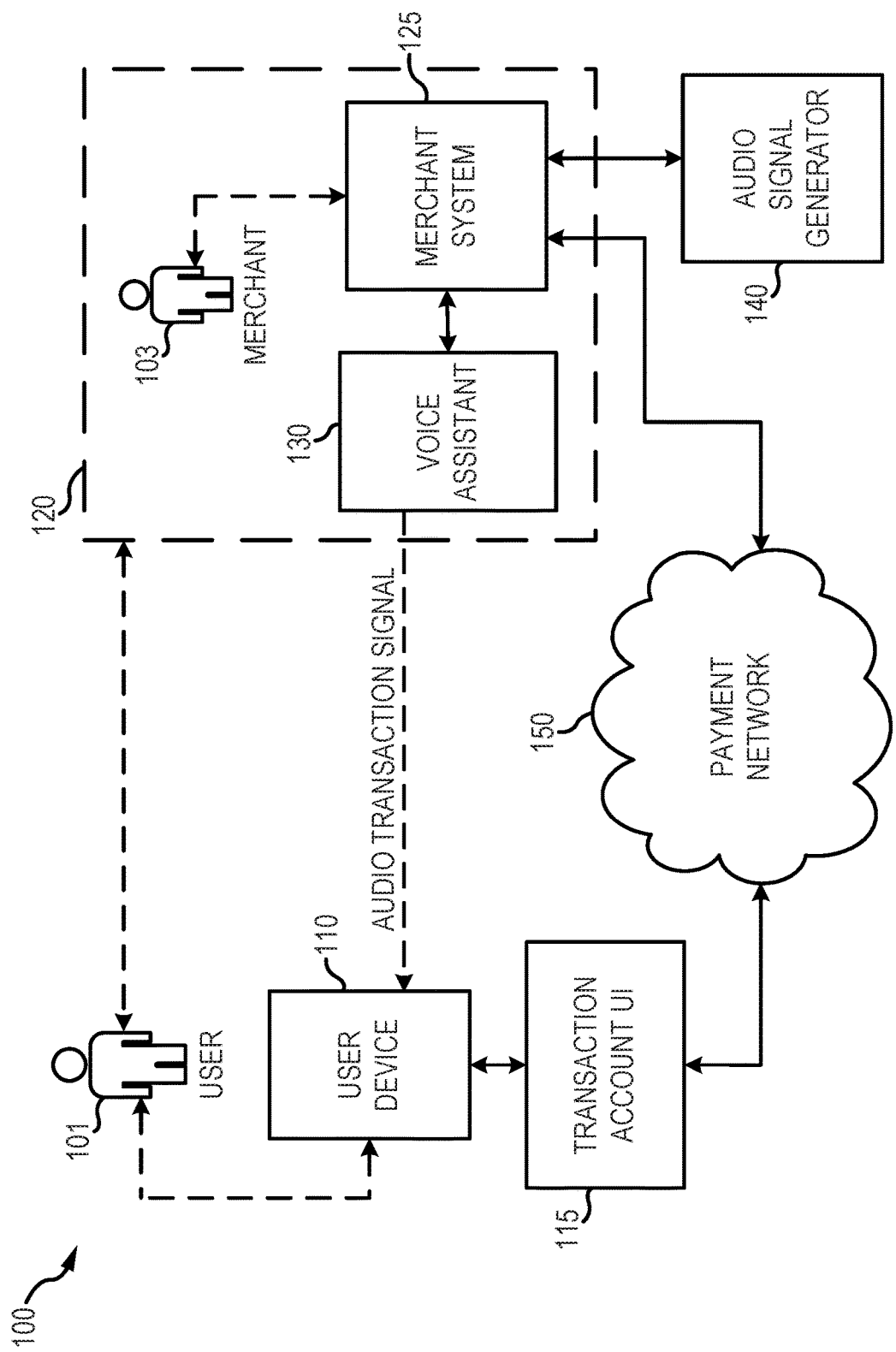
FIG. 1 is a block diagram illustrating various system components of a system for voice-enabled transactions between a user and a merchant, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

In various embodiments, systems for voice-enabled transactions using audio transaction signals are disclosed. The system may initiate and complete voice-enabled transactions between a user (e.g., a transaction account user, holder, beneficiary, etc.) and a merchant. For example, the user may initiate a transaction with the merchant. The merchant may invoke an audio signal generator to generate an audio transaction signal comprising details of the transaction. The merchant may use a voice assistant (e.g., an IoT device, smart speaker, etc.) to play the audio transaction signal. The user's mobile device (e.g., IoT device, smart phone, etc.) may detect and ingest the audio transaction signal. In response to ingesting the audio transaction signal, the user's mobile device may prompt the user to interact with a payment network (e.g., via a mobile application) to authorize and complete the transaction. The merchant may receive the transaction authorization from the payment network.

Therefore, the system may allow the merchant to conduct transactions without needing a point of sale system. In that respect, the system may provide a technical solution to the technical problems presented in typical point of sale transactions. Thus, by transmitting, storing, and accessing data using the processes described herein, the security of the data is improved, which decreases the risk of the computer, network, or data from being compromised. Further, the system may allow the user to initiate and complete voice-enabled transactions without needing to verbally relay a transaction account number (or other sensitive data), and without needing to preregister for a virtual payment platform, provide transaction account data or tokens to the merchant, or the like. In various embodiments, the system may also improve mobile phone battery life compared to mobile devices typically used in transactions. For example, the system may preserve mobile phone battery life by using less battery intensive audio transaction signals to complete transactions, compared to typical more battery intensive systems such as NFC or BLUETOOTH® transaction channels.

In various embodiments, and with reference to FIG. 1, a system 100 for voice-enabled transactions is disclosed (e.g., a voice interface transaction system). System 100 may enable voice-enabled transactions using audio signals between a user 101 (e.g., a transaction account user, holder, beneficiary, or the like) and a merchant 103. System 100 may comprise one or more of a user device 110, a transaction account user interface (UI) 115, a merchant environment 120, a merchant system 125, a voice assistant 130, an audio signal generator 140, and/or a payment network 150. System 100 may also contemplate uses in association with web services, utility computing, pervasive and individualized computing, security and identity solutions, autonomic computing, cloud computing, commodity computing, mobility and wireless solutions, open source, biometrics, grid computing, and/or mesh computing.

In various embodiments, user 101 may desire to initiate a voice-enabled transaction with merchant 103. For example, user 101 may interact with merchant environment 120 to initiate and complete voice-enabled transactions. Merchant environment 120 may include one or more of merchant 103, merchant system 125, and/or voice assistant 130. For example, merchant environment 120 may represent a kiosk, a brick and mortar store, or the like, or may be a virtual platform configured to allow user 101 to initiate the voice-enabled transaction with merchant 103. In that respect, and as discussed further herein, user 101 may verbally interact with merchant 103 (e.g., via a checkout clerk or the like), or may interact with merchant system 125 and/or voice assistant 130 directly as part of an automated checkout system, a self-checkout system, or the like.

In various embodiments, user device 110 may be configured to detect and ingest one or more audio transaction signals and interact with payment network 150 to authorize and verify the voice enable transaction, as discussed further herein. In various embodiments, user device 110 may also be configured to decrypt the audio transaction signal and parse the audio transaction signal to determine the data contained therein. For example, user device 110 may be configured to detect the audio transaction signal based on a header soundwave or the like at the beginning of the audio transaction signal configured to alert user device 110 that the audio sound is an audio transaction signal. In response to detecting the header soundwave (e.g., user device 110 is configured to listen for a specific soundwave having a defined amplitude, frequency, or similar sound characteristic), user device 110 may ingest the remaining audio transaction signal following the header soundwave. User device 110 may be configured to parse the audio transaction signal to determine the transaction data (e.g., merchant identifier and transaction amount) contained therein. For example, user device 110 may comprise a digital signal processor configured to process the audio transaction signal. User device 110 may implement any suitable sound processing algorithm to determine sound characteristics of the audio transaction signal, such as, for example, Fast Fournier Transform (FFT), Discrete Fournier Transform (DFT), or the like. User device 110 may translate the audio transaction signal by determining soundwaves having defined amplitudes, frequencies, or similar defined sound characteristics matching stored defined sound characteristics. In that regard, soundwaves having defined sound characteristics may correspond to a character or set of characters such that the soundwaves may translate into the transaction data. Each soundwave may also comprise a tag, header, operator, or the like configured to alert user device 110 of a particular data type being ingested (e.g., merchant identifier, transaction data, image, etc.). In that regard, user device 110 may process each soundwave to determine the transaction data contained therein.

User device 110 may comprise any suitable hardware, software, and/or database components capable of sending, receiving, and storing data. For example, user device 110 may comprise a personal computer, personal digital assistant, cellular phone, smartphone (e.g., IPHONE®, BLACKBERRY®, and/or the like), IoT device, kiosk, and/or the like. User device 110 may comprise an operating system, such as, for example, a WINDOWS® mobile operating system, an ANDROID® operating system, APPLE® IOS®, a BLACKBERRY® operating system, a LINUX® operating system, and the like. User device 110 may comprise hardware and/or software components configured to detect and ingest the audio transaction signal, such as, for example, a microphone or any other suitable audio recording component. User device 110 may also comprise software components installed on user device 110 and configured to allow user 101, via user device 110, access to transaction account UI 115. For example, user device 110 may comprise a web browser (e.g., MICROSOFT INTERNET EXPLORER®, GOOGLE CHROME®, etc.), an application, a micro-app or mobile application, or the like, configured to allow user 101 to access and interact with transaction account UI 115.

User device 110 may be in electronic communication with transaction account UI 115. Transaction account UI 115 may comprise software, a mobile application, a web interface, or the like accessible from user device 110. For example, transaction account UI 115 may include a graphical user interface ("GUI"), software modules, logic engines, various databases, interfaces to systems and tools, and/or computer networks. Transaction account UI 115 may be in electronic communication with payment network 150, and may allow user 101, via user device 110, to interact with payment network 150. For example, transaction account UI 115 may allow user 101 to view various data associated with one or more transaction accounts (e.g., transaction account balances, transactions, loyalty points, etc.), confirm voice-enabled transactions, and/or the like. User 101 may interact with transaction account UI 115 in response to user device 110 receiving an audio transaction signal, as discussed further herein. Access to transaction account UI 115 may be controlled by the authorization of user credentials. For example, user 101 may access transaction account UI 115 by inputting user credentials (e.g., a username, password, biometric input, etc.), and in response to payment network 150 authenticating the user credentials (e.g., by comparing the input user credentials to stored user credentials).

In various embodiments, merchant system 125 may be configured to conduct voice-enabled transactions with user 101. For example, merchant system 125 may conduct transactions with user 101 via merchant 103, voice assistant 130, or directly with user 101. In that regard, merchant system 125 may be configured to receive transaction requests, invoke audio signal generator 140 based on the transaction request, receive an audio transaction signal from audio signal generator 140, pass the audio transaction signal to voice assistant 130 for audio transmission to user device 110, and receive a transaction authorization from payment network 150 to complete the transaction request, as discussed further herein. Merchant system 125 may be in electronic communication with voice assistant 130, audio signal generator 140, and/or payment network 150. Merchant system 125 may comprise any suitable combination of hardware, software, and/or database components. For example, merchant system 125 may comprise one or more network environments, servers, computer-based systems, processors, databases, and/or the like. In various embodiments, merchant system 125 may be computer based, and may comprise a processor, a tangible non-transitory computer-readable memory, and/or a network interface, along with other suitable system software and hardware components. Instructions stored on the tangible non-transitory memory may allow merchant system 125 to perform various functions, as described herein. The processor may include any logic device such as one or more of a central processing unit (CPU), an accelerated processing unit (APU), a digital signal processor (DSP), a field programmable gate array (FPGA), an application specific integrated circuit (ASIC), or the like.

In various embodiments, voice assistant 130 may be in electronic communication with merchant system 125. In various embodiments, voice assistant 130 may also be integrated within merchant system 125 (e.g., voice assistant 130 may comprise a software and/or hardware component in merchant system 125). Voice assistant 130 may be configured to communicate with user 101 regarding the transaction request and transmit one or more audio transaction signals based on the transaction request, as discussed further herein. Voice assistant 130 may comprise any suitable device capable of receiving voice commands and transmitting audio signals, such as, for example an IoT device, a smart speaker, a mobile device, or the like. Voice assistant 130 may comprise one or more hardware, software, and/or database components. For example, voice assistant 130 may comprise one or more computing devices, such as, for example a computer or processor, or a set of computers, processors, and/or application specific integrated circuits (ASICs), although other types of computing units or system may also be used.

In various embodiments, voice assistant 130 may comprise or integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can generally assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOMEPOD® systems may also allow user 101 to access information about eligible transaction accounts linked to an online account across all digital assistant-enabled devices (e.g., via payment network 150).

In various embodiments, voice assistant 130 may also comprise a biometric security system that may be used for providing biometrics as a primary or secondary form of identification. The biometric security system may include a transponder and a reader communicating with voice assistant 130. The biometric security system also may include a biometric sensor that detects biometric samples and a device for verifying biometric samples. The biometric security system may be configured with one or more biometric scanners, processors and/or systems. A biometric system may include one or more technologies, or any portion thereof. As used herein, a biometric may include a user's voice, fingerprint, facial, ear, signature, vascular patterns, DNA sampling, hand geometry, sound, olfactory, keystroke/typing, iris, retinal, or any other biometric relating to recognition based upon any body part, function, system, attribute and/or other characteristic, or any portion thereof.

In various embodiments, audio signal generator 140 may be configured to generate an audio transaction signal in response to being invoked by merchant system 125, as discussed further herein. The audio transaction signal may comprise data corresponding to the transaction request (e.g., a merchant identifier, a transaction amount, etc.), and may be encrypted. The audio transaction signal may comprise any suitable or desired frequency capable of being detected by user device 110. For example, and in accordance with various embodiments, the audio transaction signal may comprise a frequency audible to humans, such as a frequency of about 20 Hertz (Hz) to about 20,000 Hz (wherein "about" as used in this context refers to +/−10 Hz). As a further example, and in accordance with various embodiments, the audio transaction signal may comprise a frequency inaudible to humans, such as, for example, a frequency of less than about 20 Hz or greater than about 20,000 Hz (wherein "about" as used in this context refers to +/−10 Hz).

In various embodiments, audio signal generator 140 may generate the audio transaction signal to comprise one or more soundwaves having defined soundwave characteristics. In that regard each soundwave, or plurality of soundwaves, may correspond to a header, tag, operator, or the like, or to transaction data. For example, each header, tag, operator, or the like may comprise a soundwave configured to alert user device 110 of the data proceeding the header, tag, operator, or the like. For example, a header soundwave may be placed at the beginning of the audio transaction signal to alert user device 110 that the audio sound is an audio transaction signal. Headers, tags, operators or the like may also be used to alert user device 110 that the proceeding data is transaction data, such as, for example, a merchant identifier, a transaction amount, an image, or the like. Each header, tag, operator, or the like may comprise defined sound characteristics (e.g., a specified frequency, amplitude, etc.). The defined sound characteristics may be known by user device 110 such that user device 110 may detect the defined sound characteristic to determine the header, tag, operator, or the like, or transaction data. For example, each defined sound characteristic may correspond to an alphanumeric character, a plurality of alphanumeric characters, or to data category (e.g., used in a header, tag, operator, etc. to notify user device 110 of a proceeding audio transaction signal, merchant identifier, transaction amount, image, etc.). Audio signal generator 140 may be configured to generate the audio transaction signal using any suitable audio processing technique or algorithm, such as, for example, Fast Fournier Transform (FFT), Discrete Fournier Transform (DFT), or the like.

Audio signal generator 140 may be in electronic communication with merchant system 125. Audio signal generator 140 may comprise one or more hardware, software, and/or database components. For example, audio signal generator 140 may comprise an electronic device capable of generating audio signals. The electronic device may comprise one or more computing devices, such as, for example a computer or processor, or a set of computers and/or processors, although other types of computing units or systems may also be used. The processor may include any logic device such as one or more of a central processing unit (CPU), an accelerated processing unit (APU), a digital signal processor (DSP), a field programmable gate array (FPGA), an application specific integrated circuit (ASIC), or the like. As a further example, audio signal generator 140 may comprise software configured to generate audio signals, such as, for example, a signal generation application or the like.

In various embodiments, payment network 150 may be configured to receive the voice-enabled transaction data (e.g., parsed from the audio transaction signal) from user device 110, via transaction account UI 115, authenticate user 101 (e.g., based on user credentials), process and settle the transaction request, and transmit a transaction approval notification to merchant system 125, as discussed further herein. Payment network 150 may be in electronic communication with transaction account UI 115 and/or merchant system 125. Payment network 150 may comprise any suitable combination of hardware, software, and/or database components. For example, payment network 150 may comprise one or more network environments, servers, computer-based systems, processors, databases, and/or the like. Payment network 150 may comprise at least one computing device in the form of a computer or processor, or a set of computers/processors, although other types of computing units or systems may be used, such as, for example, a server, web server, pooled servers, or the like. Payment network 150 may also include one or more data centers, cloud storages, or the like, and may include software, such as APIs, configured to perform various operations discussed herein. In various embodiments, payment network 150 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, payment network 150 may comprise or interact with a traditional payment network or transaction network to facilitate transactions, purchases, and payments, authorize transactions, settle transactions, and the like. For example, payment network 150 may represent existing proprietary networks that presently accommodate transactions for credit cards, debit cards, and/or other types of transaction accounts or transaction instruments. Payment network 150 may be a closed network that is secure from eavesdroppers. In various embodiments, payment network 150 may comprise an exemplary transaction network such as AMERICAN EXPRESS®, VISANET®, MASTERCARD®, DISCOVER®, INTERAC®, Cartes Bancaires, JCB®, private networks (e.g., department store networks), and/or any other payment network, transaction network, or the like. Payment network 150 may include systems and databases related to financial and/or transactional systems and processes, such as, for example, one or more authorization engines, authentication engines and databases, settlement engines and databases, accounts receivable systems and databases, accounts payable systems and databases, and/or the like. In various embodiments, payment network 150 may also comprise a transaction account issuer's Credit Authorization System ("CAS") capable of authorizing transactions, as discussed further herein. Payment network 150 may be configured to authorize and settle transactions, and maintain transaction account member databases, accounts receivable databases, accounts payable databases, or the like.

Although the present disclosure makes reference to payment network 150, it should be understood that principles of the present disclosure may be applied to a system for voice-enabled transactions having any suitable number of payment networks. For example, system 100 may comprise one or more payment networks 150 each corresponding to or associated with a different issuer system or network.

Figure 2:
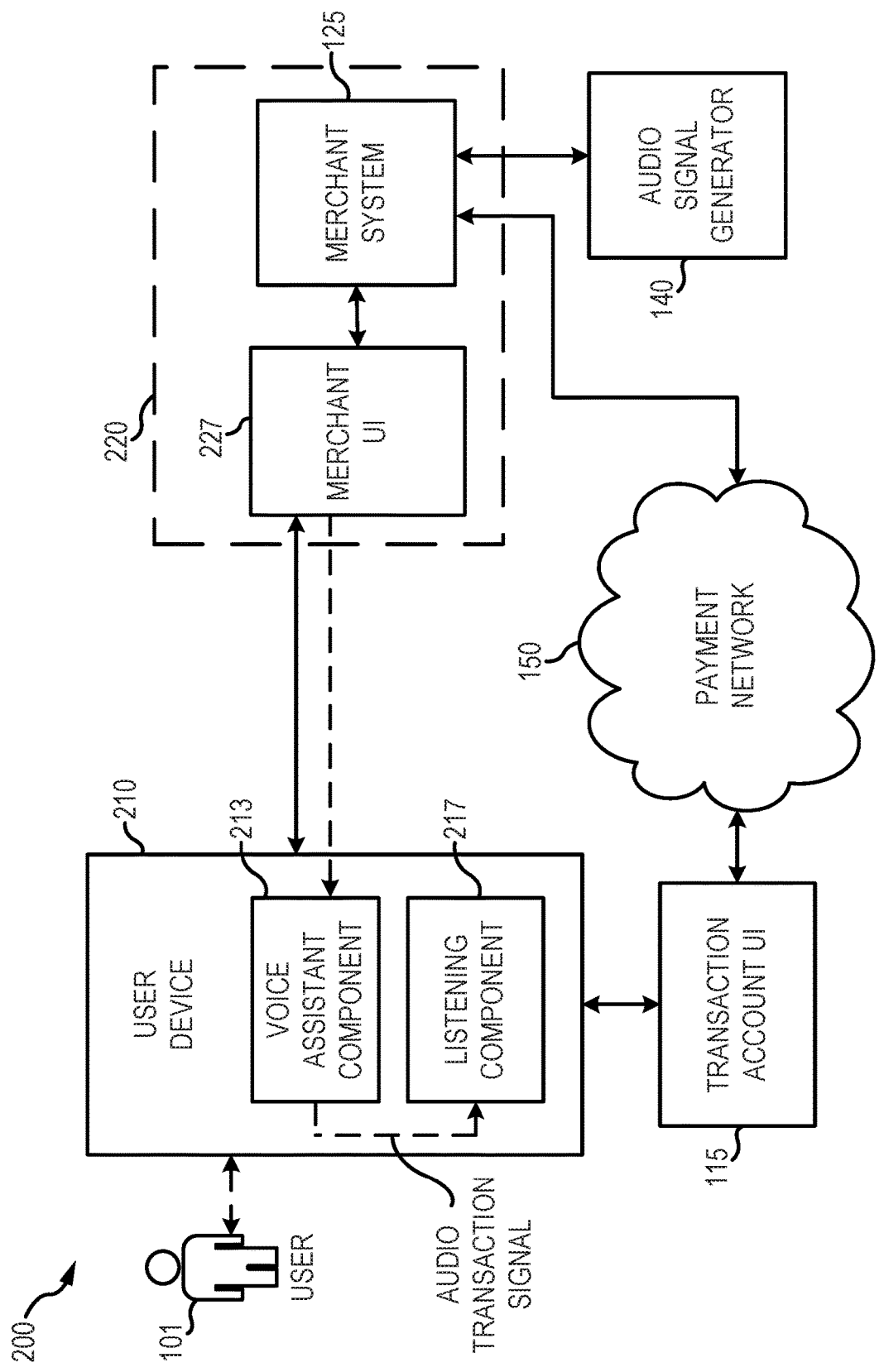
FIG. 2 is a block diagram illustrating various system components of a system for voice-enabled transactions between a user device and a merchant user interface (UI), in accordance with various embodiments.

In various embodiments, and with reference to FIG. 2, a system 200 for voice-enabled transactions between a user device and a merchant user interface (UI) is disclosed. In that respect, system 200 may be similar to system 100 (with brief reference to FIG. 1), and may allow voice-enabled transactions using audio signals between a user device and a merchant UI. For example, user 101 may desire to initiate and complete a voice-enabled transaction using user device 210 by browsing one or more merchant UIs 227. System 200 may comprise one or more of a user device 210, transaction account UI 115 (as previously discussed), a merchant environment 220, merchant system 125 (as previously discussed), a merchant UI 227, audio signal generator 140 (as previously discussed), and/or payment network 150 (as previously discussed).

In various embodiments, user device 210 may be similar to user device 110, with brief reference to FIG. 1, and may comprise similar hardware and software capabilities and features. User device 210 may comprise a voice assistant component 213 and/or a listening component 217. Voice assistant component 213 may be similar to voice assistant 130, with brief reference to FIG. 1. Voice assistant component 213 may comprise a hardware and/or software component integrated within user device 210. Voice assistant component 213 may be configured to communicate with user 101 regarding the transaction request and transmit one or more audio transaction signals based on the transaction request, as discussed further herein. For example, voice assistant component 213 may comprise a smart digital assistant technology, as discussed further herein.

In various embodiments, listening component 217 may be configured to detect and ingest audio transaction signals transmitted by voice assistant component 213. Listening component 217 may comprise one or more software and/or hardware components capable of detecting and ingesting audio transaction signals. For example, listening component 217 may comprise a microphone and/or any other audio recording component. In that regard, and as discussed further herein, user device 210 may be configured to play the audio transaction signal (via voice assistant component 213) and detect and ingest the audio transaction signal (via listening component 217).

In various embodiments, and as discussed further herein, voice assistant component 213 may be configured to enable user device 210 to generate and transmit one or more audio transaction signals to merchant environment 220. For example, user device 210 may play the audio transaction signal (via voice assistant component 213) and the audio transaction signal may be detected and ingested by merchant system 125. In that regard, user device 210 and/or merchant system 120 may be configured to transmit and/or detect and ingest audio transaction signal to enable bi-directional communication between user device 210 and merchant system 120.

In various embodiments, merchant environment 220 may be similar to merchant environment 120, with brief reference to FIG. 1, and may comprise merchant system 125 and merchant UI 227. Merchant UI 227 may include a graphical user interface ("GUI"), software modules, logic engines, various databases, interfaces to systems and tools, and/or computer networks. For example, merchant UI 227 may comprise software, a mobile application, a web interface, or the like accessible from user device 210. Merchant UI 227 may allow user 101, via user device 210, to browse, interact with, and purchase physical goods, digital goods, services, and initiate the voice-enabled transaction with the merchant (e.g., merchant system 125). Merchant UI 227 may be in electronic communication with merchant system 125, and/or may be hosted on merchant system 125 and accessible via user device 210.

As used herein, "transmit" may include sending at least a portion of electronic data from one system component to another. Additionally, as used herein, "data," "information," "audio signal," or the like may include encompassing information such as commands, queries, files, messages, data for storage, and the like in digital or any other form.

As used herein, "electronic communication" may comprise a physical coupling and/or non-physical coupling capable of enabling one or more system components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac/ad/ah/af signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system components may be in electronic communication via a network. As used herein, the term "network" may further include any cloud, cloud computing system, or electronic communications system or method that incorporates hardware and/or software components. Communication amongst the one or more system components may be accomplished through any suitable communication channels, such as, for example, a telephone network, an extranet, an intranet, internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an internet service provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale, or distribution of any goods, services or information over any network having similar functionality described herein.

A network may be unsecure. Thus, communications over the network may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system 100 (or system 200, with brief reference to FIG. 2) may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

Figure 3:
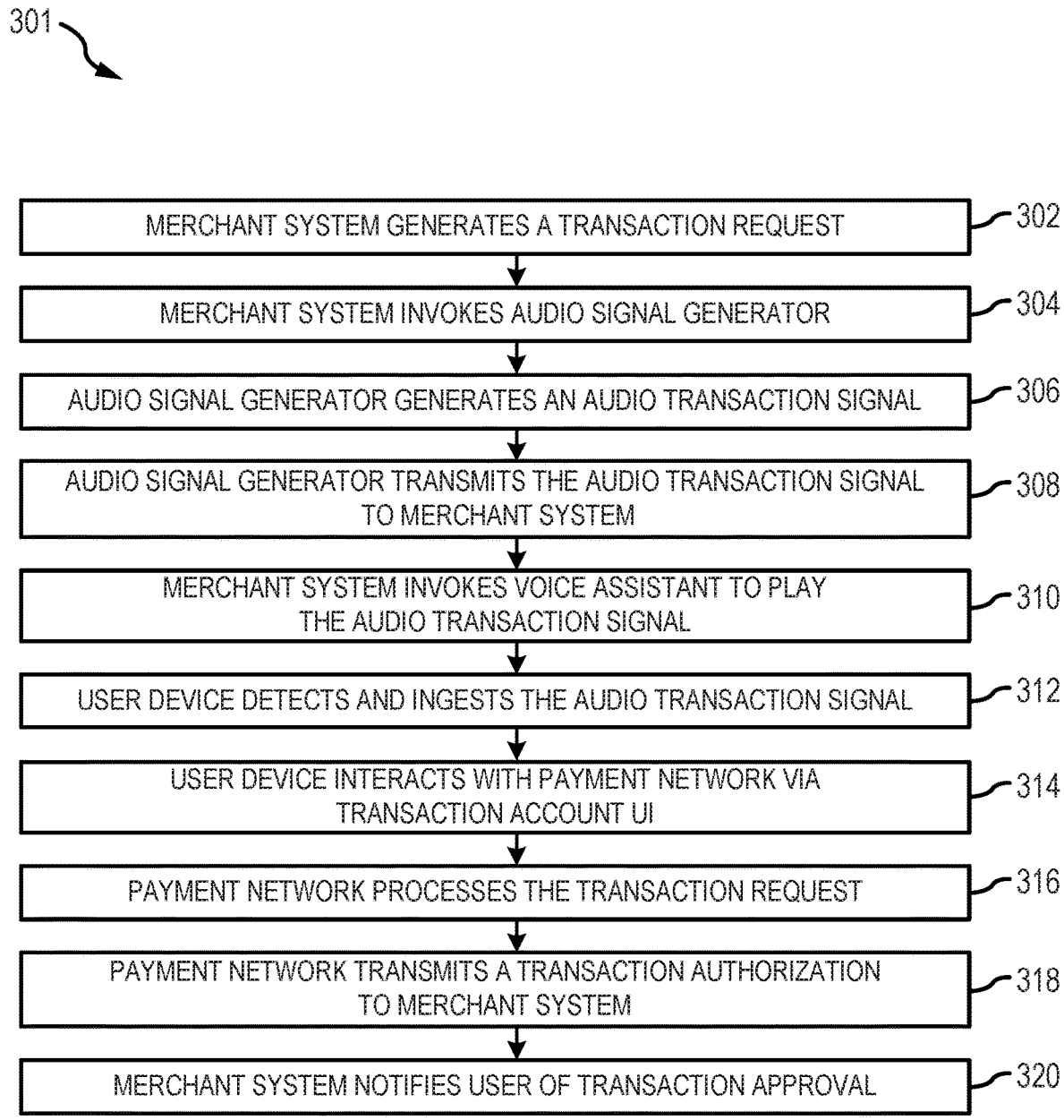
FIG. 3 illustrates a process flow for a method for voice-enabled transactions using audio signals, in accordance with various embodiments.

Referring now to FIG. 3 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIG. 3, but also to the various system components as described above with reference to FIGS. 1 and 2. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

In various embodiments, a method 301 for voice-enabled transactions using audio transaction signals is disclosed. Method 301 may enable user 101 to complete a voice-enabled transaction with merchant environment 120. For example, user 101 may verbally interact directly with merchant 103 to initiate the voice-enabled transaction, interface with merchant system 125 to initiate the voice-enabled transaction (e.g., via an automated checkout process, self-checkout station, or the like, wherein "interface" may comprise scanning goods to purchase, interacting with a touch-screen or display to select payment options, or the like), interface with merchant UI 227 to initiate the voice-enabled transaction (e.g., by browsing merchant UI 227 to select goods or services to purchase, by selecting payment options, or the like), or through any other suitable method. In response to user 101 initiating the voice-enabled transaction, merchant system 125 generates a transaction request (step 302). The transaction request may comprise a transaction amount, a merchant identifier (e.g., merchant ID, merchant name, etc.), and/or any other desired transaction data.

In various embodiments, merchant system 125 invokes audio signal generator 140 (step 304) based on the transaction request. Merchant system 125 may invoke audio signal generator 140 by transmitting the transaction request to audio signal generator 140. Audio signal generator 140 generates an audio transaction signal (step 306) in response to being invoked. The audio transaction signal may be generated to comprise any suitable digital audio file format, such as a lossless format (e.g., WAV, AIFF, FLAC, etc.) or a lossy format (e.g., MP3, AAC, WMA, etc.). The audio transaction signal may be compressed or uncompressed. The audio transaction signal may be generated to comprise one or more soundwaves having defined soundwave characteristics. In that regard each soundwave, or plurality of soundwaves, may correspond to a header, tag, operator, or the like, or to transaction data. For example, each header, tag, operator, or the like may comprise a soundwave configured to alert user device 110 of the data proceeding the header, tag, operator, or the like. For example, a header soundwave may be placed at the beginning of the audio transaction signal to alert user device 110 that the audio sound is an audio transaction signal. Headers, tags, operators or the like may also be used to alert user device 110 that the proceeding data is transaction data, such as, for example, a merchant identifier, a transaction amount, an image, or the like. Each header, tag, operator, or the like may comprise defined sound characteristics (e.g., a specified frequency, amplitude, etc.). The defined sound characteristics may be known by user device 110 such that user device 110 may detect the defined sound characteristic to determine the header, tag, operator, or the like, or transaction data. For example, each defined sound characteristic may correspond to an alphanumeric character, a plurality of alphanumeric characters, or to data category (e.g., used in a header, tag, operator, etc. to notify user device 110 of a proceeding audio transaction signal, merchant identifier, transaction amount, image, etc.). Audio signal generator 140 may be configured to generate the audio transaction signal using any suitable audio processing technique or algorithm, such as, for example, Fast Fournier Transform (FFT), Discrete Fournier Transform (DFT), or the like.

In various embodiments, audio signal generator 140 may also be configured to encrypt the transaction request prior to generating the audio transaction signal. The transaction request may be encrypted using any suitable technique discussed herein, known in the art, or that later become available.

The audio transaction signal may be generated to comprise any suitable frequency capable of being detected by user device 110 (or user device 210, with reference to FIG. 2). For example, and in accordance with various embodiments, the audio transaction signal may be generated to comprise a frequency audible to humans, such as about 20 Hertz (Hz) to about 20,000 Hz (wherein "about" as used in this context refers to +/−10 Hz). In various embodiments, the audio transaction signal may be generated to comprise a frequency inaudible to humans, such as, for example, less than about 20 Hz or greater than about 20,000 Hz (wherein "about" as used in this context refers to +/−10 Hz). In various embodiments, the frequency of the audio transaction signal may also be specified by merchant system 125.

In response to generating the audio transaction signal, in various embodiments, audio signal generator 140 transmits the audio transaction signal to merchant system 125 (step 308). Merchant system 125 invokes a voice assistant to play the audio transaction signal (step 310). For example, and with reference to FIG. 1, merchant system 125 may invoke voice assistant 130 by transmitting the audio transaction signal to voice assistant 130. In response to receiving the audio transaction signal, voice assistant 130 may be configured to play the audio transaction signal (at any specified or desired decibel (dB)). In that respect, and in accordance with various embodiments, prior to (or during) playing the audio transaction signal, merchant system 125 (via voice assistant 130, a display prompt, or the like) and/or merchant 103 may notify user 101 to ready user device 110.

In various embodiments, voice assistant 130 may be configured to play the audio transaction signal to a plurality of user devices 110. In that respect, the audio transaction signal may be played for fundraising, charity, or the like to enable the plurality of user devices 110 to each donate or provide money to merchant system 125.

As a further example, and with reference to FIG. 2, merchant system 125 may invoke voice assistant component 213 by transmitting the audio transaction signal to voice assistant component 213, via user device 210. In response to receiving the audio transaction signal, voice assistant component 213 may be configured to play the audio transaction signal via a speaker or similar audio transmission component in user device 210 (at any specified or desired decibel (dB)).

In various embodiments, the voice assistant may be configured to play the audio transaction signal at a decibel (dB) that may only be picked up within proximity of the voice assistant (e.g., to ensure only the desired user device 110 detects the audio transaction signal).

With specific reference again to FIG. 3, the user device detects and ingests the audio transaction signal (step 312). For example, and with reference to FIG. 1, user device 110 may be configured to detect the audio transaction signal using a microphone or similar listening component in user device 110. In various embodiments, user device 110 may implement noise canceling and/or noise filtering hardware or software configured to enable user device 110 to receive the audio transaction signal with reduced interruption. In that regard, user device 110 may implement any suitable type of noise canceling software and/or hardware. User device 110 may detect the audio transaction signal through passive listening or active listening. For example, in active listening, user 101 may access user device 110 and instruct user device 110 (via a mobile application, device setting, etc.) to actively listen for audio signals. As a further example, in passive listening, user device 110 may be configured to passively listen for audio signals without needing user 101 input.

In various embodiments, the header of the audio transaction signal may include a voice assistant awake word configured to notify user device 110 to begin passive listening. For example, the awake word may comprise a soundwave having defined sound characteristics (e.g., amplitude, frequency, etc.), and may comprise a frequency audible or inaudible to humans. As a further example, the awake word may be dependent on the voice assistant technology being implemented, such as, for example, "Siri," "Alexa," "Google," etc.

As a further example, and with reference to FIG. 2, user device 210 may be configured to detect the audio transaction signal using listening component 217. Listening component 217 may detect the audio transaction signal through passive listening or active listening. For example, and similar to above, in active listening, user 101 may access user device 210 and instruct user device 210 (via a mobile application, device setting, etc.) to actively listen for audio signals using listening component 217. As a further example, in passive listening, listening component 217 may be configured to passively listen for audio signals without needing user 101 input.

With specific reference again to FIG. 3, user device 110 (210) interacts with payment network 150 via transaction account UI 115 (step 314), based on the audio transaction signal (e.g., as specified in a header, tag, operator, etc., as previously discussed). For example, in response to receiving the audio transaction signal, user device 110 (210) may be configured to access transaction account UI 115. Transaction account UI 115 may prompt user 101 to enter user credentials to access transaction account UI 115, such as, for example, a username and password, biometric input, or the like. Transaction account UI 115 may instruct user device 110 to transmit the user credentials to payment network 150 to authorize user 101 access (e.g., based on stored credentials or the like).

In response to authorizing user 101, transaction account UI 115 may transmit the audio transaction signal and/or the transaction data to payment network 150 for processing. In various embodiments, user device 110 (210) may convert at least a portion of the audio transaction signal to an accepted transaction data packet, prior to transferring the data to transaction account UI 115. In various embodiments, user device 110 (210) may also be configured to transmit the entire audio transaction signal to transaction account UI 115, and transaction account UI 115 may be configured to decrypt and parse the audio transaction signal, using any suitable technique described herein.

In various embodiments, user device 110 may be unable to connect to payment network 150 (e.g., in response to user device 110 not having a network connection, in response to maintenance of payment network 150, etc.). In that respect, user device 110 may be configured to generate a second audio signal, and may play the second audio signal for detection by the voice assistant, similar to the audio transaction signal. The second audio signal may comprise a predefined preauthorization amount. The predefined preauthorization amount may comprise a payment amount that user 101 has been preauthorized to use (by payment network 150) in response to user device 110 being unable to communicate with payment network 150. The predefined preauthorization amount may comprise a payment token, a payment cryptogram, and/or the like. In response to receiving the second audio signal, merchant system 125 may be configured to process the second audio signal and authorize the transaction amount using any suitable technique or process known in the art.

In various embodiments, payment network 150 processes the transaction request (step 316). Payment network 150 may process, authorize, and settle the transaction request using any suitable method. In various embodiments, payment network 150 may prompt user device 110 (210), via transaction account UI 115, to verify transaction details (e.g., transaction amount, merchant name, shipping preferences (e.g., address, email address, etc.), desired transaction account, etc.) prior to authorizing the transaction request. In various embodiments, payment network 150 may also prompt user 101 via voice assistant 130 (or voice assistant component 213), and user 101 may verbally confirm the transaction details.

In that regard, the processing, authorization, and/or settlement of transactions may be completed in response to user device 110 initiating the transaction with payment network 150 (e.g., in contrast to typical transactions that are initiated from merchant system 125 to payment network 150).

In response to authorizing the transaction request, payment network 150 transmits a transaction authorization to merchant system 125 (step 318). Any portion of the transaction authorization may be in the form of a regular data packet or in the form of an audio signal. The transaction authorization may comprise data indicating that the transaction account associated with user 101 was successfully charged or debited, based on the transaction request, and/or that the transaction request was authorized by payment network 150. Merchant system 125 notifies user 101 of transaction approval (step 320). For example, merchant 103 may verbally (e.g., with an audio signal) relay to user 101 that the transaction request was approved. As a further example, merchant system 125 may notify user 101 that the transaction request was approved via a text display (e.g., via an interface on an automated checkout) or via voice assistant 130 (e.g., by instructing voice assistant 130 to audibly communicate the transaction approval to user 101). Merchant system 125 may also be configured to notify user 101 via an email, push notification, text message (e.g., SMS, MMS, etc.) or the like transmitted to user device 110 (210).

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, push notification, and/or any other method known in the art.

The phrases "user," "transaction account holder," "transaction account beneficiary," "transaction account affiliate," "consumer," "customer," "cardmember," or the like shall include any person, entity, business, government organization, business, software, hardware, or machine associated with a transaction account, who buys merchant offerings offered by one or more merchants using the transaction account, and/or who is legally designated for performing transactions on the transaction account, regardless of whether a physical card is associated with the transaction account. For example, the user may include a transaction account owner, a transaction account user, an account affiliate, a child account user, a subsidiary account user, a beneficiary of an account, a custodian of an account, and/or any other person or entity affiliated or associated with the transaction account.

Phrases and terms similar to "transaction account," "account number," "account code", or "consumer account" as used herein, may include any device, code (e.g., one or more of an authorization/access code, personal identification number ("PIN"), internet code, other identification code, and/or the like), number, letter, symbol, digital certificate, smart chip, digital signal, analog signal, biometric, or other identifier/indicia suitably configured to allow the consumer to access, interact with or communicate with the system. The transaction account number may optionally be located on or associated with a rewards account, charge account, credit account, debit account, prepaid account, telephone card, embossed card, smart card, magnetic stripe card, bar code card, transponder, radio frequency card, or an associated account.

The transaction account number may be distributed and stored in any form of plastic, electronic, magnetic, radio frequency, wireless, audio, and/or optical device capable of transmitting or downloading data from itself to a second device. The transaction account number may be, for example, a sixteen-digit account number, although each transaction account issuer has its own numbering system, such as the fifteen-digit numbering system used by the AMERICAN EXPRESS® company. In that respect, each of the transaction account issuer's transaction account numbers may comply with that transaction account issuer's standardized format, such that the transaction account issuer using a fifteen-digit format will generally use three-spaced sets of numbers, as represented by the number "0000 000000 00000." The first five to seven digits may be reserved for processing purposes and identify the transaction account issuer, account type, etc. In this example, the last (fifteenth) digit is used as a sum check for the fifteen digit number, and the intermediary eight-to-eleven digits are used to uniquely identify the user. A merchant identifier may be, for example, any number or alpha-numeric characters that identify a particular merchant for purposes of account acceptance, account reconciliation, reporting, or the like.

Phrases and terms similar to "financial institution" or "transaction account issuer" may include any entity that offers transaction account services. Although often referred to as a "financial institution," the financial institution may represent any type of bank, lender, or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "merchant," "business," "seller," or "supplier" may be used interchangeably with each other and shall mean any person, entity, distributor system, software, and/or hardware that is a provider, broker, and/or any other entity in the distribution chain of goods or services. For example, a merchant may be a grocery store, a retail store, a travel agency, a service provider, an on-line merchant, or the like. The merchant may request payment for goods or services sold to the user who holds a transaction account with a transaction account issuer.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, a Personal Computer Memory Card International Association (PCMCIA) slot and card, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTER- EST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, N.Y.) is an example of a commercially available middleware product. An Enterprise Service Bus ("ESB") application is another example of middleware.

The systems, computers, computer based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer based systems or the like may communicate with the server via a web client. The web client includes any device or software which communicates via any network, such as, for example any device or software discussed herein. The web client may include internet browsing software installed within a computing unit or a system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, internet of things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, and U.S. application Ser. No. 15/943,271 titled FRAUD MANAGEMENT USING A DISTRIBUTED DATABASE and filed on Apr. 2, 2018, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

The disclosure and claims do not describe only a particular outcome of voice-enabled transactions, but the disclosure and claims include specific rules for implementing the outcome of voice-enabled transactions and that render information into a specific format that is then used and applied to create the desired results of voice-enabled transactions using audio signals, as set forth in *McRO, Inc.* v. *Bandai Namco Games America Inc*. (Fed. Cir. case number 15-1080, Sep. 13, 2016). In other words, the outcome of a voice-enabled transaction can be performed by many different types of rules and combinations of rules, and this disclosure includes various embodiments with specific rules. While the absence of complete preemption may not guarantee that a claim is eligible, the disclosure does not sufficiently preempt the field of voice-enabled transactions at all. The disclosure acts to narrow, confine, and otherwise tie down the disclosure so as not to cover the general abstract idea of just a voice-enabled transaction. Significantly, other systems and methods exist for voice-enabled transactions, so it would be inappropriate to assert that the claimed invention preempts the field or monopolizes the basic tools of voice-enabled transactions. In other words, the disclosure will not prevent others from using voice-enabled transactions, because other systems are already performing the functionality in different ways than the claimed invention. Moreover, the claimed invention includes an inventive concept that may be found in the non-conventional and non-generic arrangement of known, conventional pieces, in conformance with *Bascom* v. *AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   generating, by a merchant computing device, a transaction request comprising a transaction amount and a merchant identifier;
   generating, by the merchant computing device, an audio signal comprising a header soundwave configured to indicate to a transaction account holder device that the audio signal comprises an audio transaction signal, the header soundwave including a voice assistant awake word, and wherein the audio transaction signal comprises the transaction request;
   playing, by the merchant computing device via a first voice assistant, the audio signal, wherein the transaction account holder device is configured to:
   detect the header soundwave comprised in the audio signal, and ingest the audio transaction signal by a second voice assistant in response to a passive listening detection of the voice assistant awake word in the header soundwave;

receiving, by the merchant computing device, a transaction authorization for the transaction request from a payment network associated with the transaction account holder device; and completing, by the merchant computing device, the transaction request in response to receiving the transaction authorization from the payment network.

2. The method of claim 1, wherein the audio transaction signal is generated by invoking an audio signal generator by transmitting the transaction request to the audio signal generator, wherein in response to receiving the transaction request, the audio signal generator is configured to generate the audio transaction signal.

3. The method of claim 2, wherein the audio signal generator is configured to encrypt the audio transaction signal.

4. The method of claim 1, wherein the audio transaction signal is played by invoking the first voice assistant by transmitting the audio transaction signal to the first voice assistant.

5. The method of claim 1, wherein the second voice assistant comprises a component of the transaction account holder device.

6. The method of claim 1, wherein in response to detecting the header soundwave and ingesting the audio transaction signal, the transaction account holder device is configured to interact with the payment network to authorize the transaction request.

7. The method of claim 6, wherein in response to authorizing the transaction request, the payment network is configured to transmit the transaction authorization to the merchant computing device.

8. The method of claim 1, wherein the audio transaction signal comprises a frequency of about 20 Hz to about 20,000 Hz.

9. The method of claim 1, wherein the audio transaction signal comprises a frequency inaudible to humans.

10. A system comprising:
a processor,
a tangible, non-transitory memory configured to communicate with the processor,
the tangible, non-transitory memory having instructions stored thereon that, in response to execution by the processor, cause the processor to perform operations comprising:
generating, by the processor, a transaction request comprising a transaction amount and a merchant identifier;
invoking, by the processor, an audio signal generator by transmitting the transaction request to the audio signal generator, wherein in response to receiving the transaction request, the audio signal generator is configured to generate an audio signal comprising a header soundwave configured to indicate to a transaction account holder device that the audio signal comprises an audio transaction signal, the header soundwave including a voice assistant awake word, and wherein the audio transaction signal comprises the transaction request;
invoking, by the processor, a first voice assistant to play the audio signal, wherein the transaction account holder device is configured to:
detect the header soundwave comprised in the audio signal,
ingest the audio transaction signal by a second voice assistant in response to a passive listening detection of the voice assistant awake word in the header soundwave,
wherein in response to detecting the header soundwave and ingesting the audio transaction signal, the transaction account holder device is configured to interact with a payment network to authorize the transaction request, and
wherein in response to authorizing the transaction request, the payment network is configured to transmit a transaction authorization to the processor; and
completing, by the processor, the transaction request, in response to receiving the transaction authorization from the payment network.

11. The system of claim 10, wherein the audio transaction signal comprises a frequency of about 20 Hz to about 20,000 Hz.

12. The system of claim 10, wherein the audio transaction signal comprises a frequency inaudible to humans.

13. An article of manufacture including a non-transitory, tangible computer readable storage medium having instructions stored thereon that, in response to execution by a computer based system, cause the computer based system to perform operations comprising:
generating, by the computer based system, a transaction request comprising a transaction amount and a merchant identifier;
invoking, by the computer based system, an audio signal generator by transmitting the transaction request to the audio signal generator, wherein in response to receiving the transaction request, the audio signal generator is configured to generate an audio signal comprising a header soundwave configured to indicate to a transaction account holder device that the audio signal comprises an audio transaction signal, the header soundwave including a voice assistant awake word, and wherein the audio transaction signal comprises the transaction request;
invoking, by the computer based system, a first voice assistant to play the audio signal, wherein a transaction account holder device is configured to:
detect the header soundwave comprised in the audio signal,
ingest the audio transaction signal by a second voice assistant in response to a passive listening detection of the voice assistant awake word in the header soundwave,
wherein in response to detecting the header soundwave and ingesting the audio transaction signal, the transaction account holder device is configured to interact with a payment network to authorize the transaction request, and
wherein in response to authorizing the transaction request, the payment network is configured to transmit a transaction authorization to the computer based system; and
completing, by the computer based system, the transaction request, in response to receiving the transaction authorization from the payment network.

14. The article of manufacture of claim 13, wherein the second voice assistant comprises a component of the transaction account holder device.

15. The system of claim 10, wherein the audio signal generator is configured to encrypt the audio transaction signal.

16. The system of claim 10, wherein the audio transaction signal is played by invoking the first voice assistant by transmitting the audio transaction signal to the first voice assistant.

17. The system of claim 10, wherein the second voice assistant comprises a component of the transaction account holder device.

18. The system of claim 10, wherein the first voice assistant is configured to play the audio transaction signal at a decibel (dB) level based at least in part on a proximity of the transaction account holder device.

19. The article of manufacture of claim 13, wherein the audio signal generator is configured to encrypt the audio transaction signal.

20. The article of manufacture of claim 13, wherein the first voice assistant is configured to play the audio transaction signal at a decibel (dB) level based at least in part on a proximity of the transaction account holder device.

\* \* \* \* \*